US 12,524,366 B1

United States Patent
M et al.

(10) Patent No.: US 12,524,366 B1
(45) Date of Patent: Jan. 13, 2026

(54) KERNEL BYPASS FOR ISCSI AND NVME/TCP APPLICATIONS

(71) Applicant: Chelsio Communications, Inc., Sunnyvale, CA (US)

(72) Inventors: Venkata Suman Kumar M, Bengaluru (IN); Varun Prakash, Bengaluru (IN)

(73) Assignee: Chelsio Communications, Inc., Sunnyvale, CA (US)

( * ) Notice: Subject to any disclaimer, the term of this patent is extended or adjusted under 35 U.S.C. 154(b) by 0 days.

(21) Appl. No.: 18/902,741

(22) Filed: Sep. 30, 2024

(51) Int. Cl.
*G06F 13/42* (2006.01)

(52) U.S. Cl.
CPC ............ *G06F 13/4221* (2013.01); *G06F 2213/0036* (2013.01)

(58) Field of Classification Search
CPC ............ G06F 13/4221; G06F 2213/0036
See application file for complete search history.

(56) References Cited

U.S. PATENT DOCUMENTS

| 2005/0226165 | A1* | 10/2005 | Pope | G06F 13/10 709/212 |
| 2017/0075856 | A1* | 3/2017 | Suzue | H04L 67/1001 |
| 2020/0241927 | A1* | 7/2020 | Yang | G06F 9/5027 |
| 2022/0103629 | A1* | 3/2022 | Cherian | G06F 3/067 |

* cited by examiner

*Primary Examiner* — Zachary K Huson
(74) *Attorney, Agent, or Firm* — Lee & Hayes, P.C.

(57) ABSTRACT

Techniques for host devices to offload iSCSI and NVMe/TCP data plane processing for data plane traffic to a NIC, and for the NIC to perform the data plane traffic processing in hardware. Traditionally, network protocol stacks have been implemented within the kernel of an operating system of a computing device. In light of this, iSCSI and NVMe/TCP user space applications running on host devices interact with a kernel of an operating system using system calls in order to send network traffic. However, the system calls, TCP/IP processing, and data copying required when communicating via the kernel increases CPU utilization as well as I/O latency. Techniques described herein include configuring the host device to enable kernel bypass for data path traffic for iSCSI and NVMe/TCP user space applications, and a NIC may include hardware configured to perform the iSCSI and NVMe/TCP processing for iSCSI and NVMe/TCP connections.

26 Claims, 6 Drawing Sheets

KERNEL BYPASS FOR ISCSI AND NVME/TCP APPLICATIONS

TECHNICAL FIELD

The present disclosure relates generally to techniques for implementing Internet Small Computer System Interface Protocol (iSCSI) and Non-Volatile Memory Express (NVMe) over Transport Control Protocol (NVMe/TCP) protocol stacks in hardware of network adapters to enable iSCSI and NVMe/TCP user space applications running on host devices to bypass the kernel when sending and receiving data path traffic.

BACKGROUND

Computing devices communicate with each other over various types of networks, or interconnected systems that allow the computing devices to communicate and share resources. Many different networking protocols have been established to facilitate communication of data between the computing devices in a standardized and efficient manner. Network protocol stacks includes sets of rules organized in layers to facilitate communications where each layer performs specific functions related to data transmission and reception. Traditionally, network protocol stacks have been implemented within the kernel of an operating system of a computing device. There are many reasons for this, such as enhancing security, managing privileged access, resource management, and ease in system integration.

As an example, for computing devices that communicate over the Internet or other Wide Area Network (WAN) using the Transmission Control Protocol/Internet Protocol (TCP/IP) Model, the TCP/IP protocol stack is placed in the kernel. When applications running on a computing device desire to send data using the TCP/IP model, the application must interact with the kernel using system calls to establish a TCP/IP connection over which to communicate data. Generally, the control plane operations and system calls required to manage the TCP/IP connection, as well as the data plane traffic itself, both pass through the kernel between the application and the destination device. These communications generally require multiple system calls from the user space to the kernel space to transmit and receive data, and the kernel TCP/IP stack performs the actual TCP/IP processing on behalf of the user space applications. However, the system calls, TCP/IP processing, and data copying required when communicating via the kernel increases central processing unit (CPU) utilization as well as input/output (I/O) latency experienced by the application and computing device.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
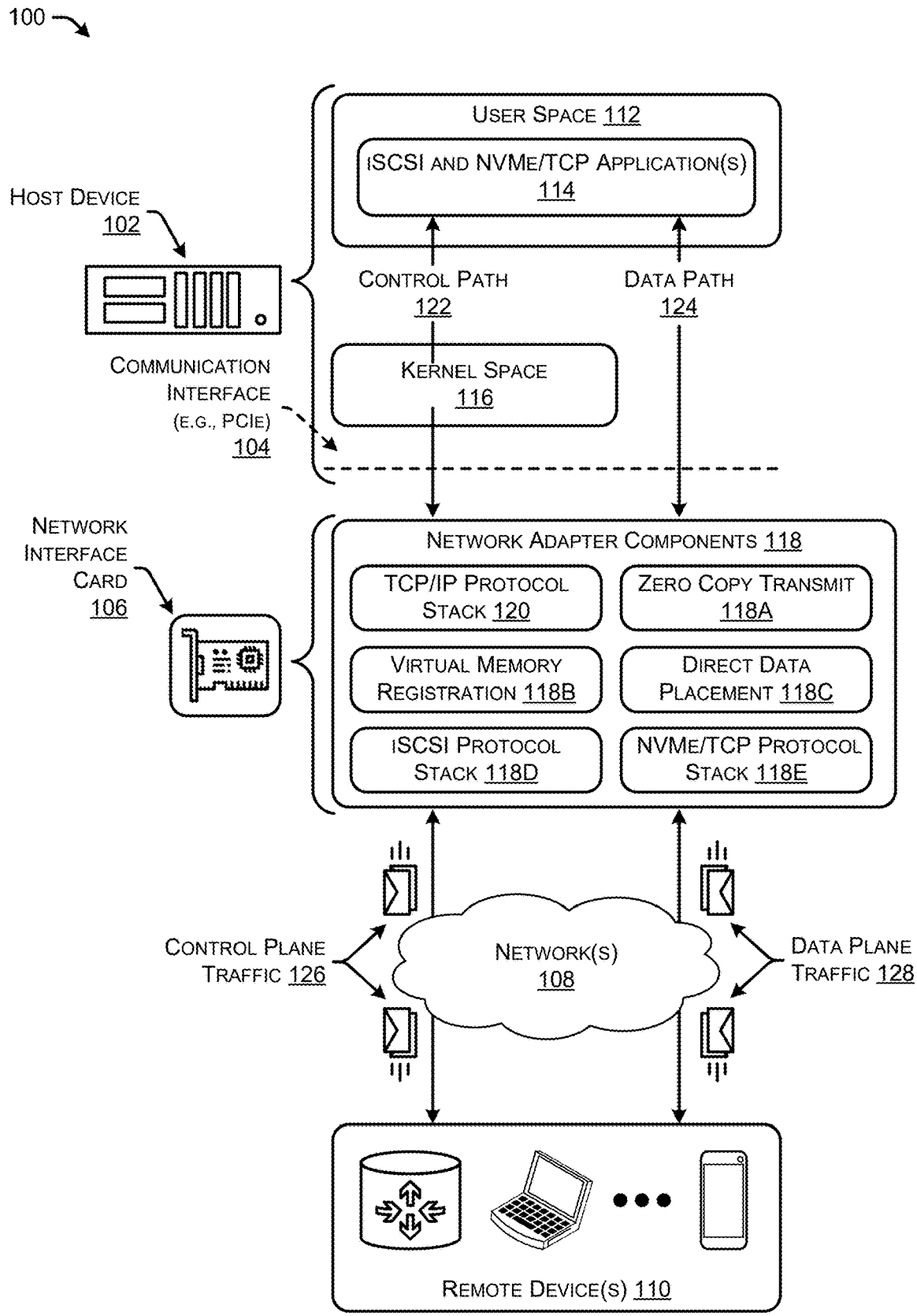
FIG. 1 illustrates a system-architecture diagram of an example host device that offloads iSCSI and NVMe/TCP processing for data plane traffic to be performed by hardware of a network interface card (NIC).

This disclosure describes techniques for host devices to offload iSCSI and NVMe/TCP data plane processing for data plane traffic to a NIC, and for the NIC to perform the data plane traffic processing in hardware.

A method described herein may be performed by a NIC that performs iSCSI and NVMe/TCP data plane processing in hardware on behalf of a host device to which the NIC is connected. The method may include communicatively coupling the NIC to a host device to facilitate registration of transmit and receive virtual memory buffers with the NIC and establishment, via the NIC, of an iSCSI or NVMe/TCP connection between the host device and a destination device. The method may further include creating transmit and receive queue and mapping transmit and receive queue memory in application's virtual address space. The method may further include receiving iSCSI or NVMe/TCP PDU transmit work request from the host device where the PDU transmit work request is written into the transmit queue memory directly from an application running in a user space of the host device. The method may further include processing the PDU transmit work request to generate a packet to be transmitted to the destination device, and transmitting the packet over a network to the destination device and receiving a packet from the destination device. Additionally, the method may include delineating iSCSI and NVMe/TCP PDU in TCP byte stream by NIC and receiving via a receive queue iSCSI or NVMe/TCP PDU receive completion and provide the application running in the user space of the host device with direct access to the PDU header and data buffers.

Additionally, the techniques described herein may be performed by a system and/or device having non-transitory computer-readable media storing computer-executable instructions that, when executed by one or more processors, performs the method described above.

Example Embodiments

This disclosure describes techniques for host devices to offload iSCSI and NVMe/TCP data plane processing for data plane traffic to a NIC, and for the NIC to perform the data plane traffic processing in hardware. Traditionally, network protocol stacks have been implemented within the kernel of an operating system of a computing device. In light of this, user space applications running on host devices interact with a kernel of an operating system using system calls in order to send network traffic, such as TCP/IP traffic. However, the system calls, TCP/IP processing, and data copying required when communicating via the kernel increases CPU utilization as well as I/O latency experienced by the application and computing device. According to the techniques described herein, the host device may be configured to enable kernel bypass for data path traffic for iSCSI and NVMe/TCP user space applications, and a NIC may include hardware (e.g., one or more hardware chips) configured to perform the iSCSI, NVMe/TCP and TCP/IP processing for iSCSI and NVMe/TCP connections.

iSCSI and NVMe/TCP user space applications may still be configured to use system calls for at least a portion of the control plane communications needed for iSCSI and NVMe/TCP connections. For instance, the user space applications may utilize system calls to the kernel of the host device in order to register transmit and receive virtual memory buffers with the NIC, create an offloaded iSCSI or NVMe/TCP server, establish the iSCSI or NVMe/TCP connection, create transmit and receive queues, and tearing down the iSCSI or NVMe/TCP connection. However, rather than having the TCP/IP protocol stack run in the kernel to perform the data plane processing, the host device may be configured to provide NIC access directly from the user space to enable direct hardware offload of data plane processing.

The NIC that is connected to the host device (e.g., via a Peripheral Component Interconnect express (PCIe) interface) may include hardware components, such as one or more hardware chips, that are configured to perform hardware-based processing for the iSCSI and NVMe/TCP data plane traffic. As an example, the NIC may include a transmit queue in which the PDU transmit work request is written to transmit iSCSI or NVMe/TCP PDU to a destination device via the TCP/IP connection. User space application issues a system call to create a transmit queue, kernel allocates memory for transmit queue and provides address of this memory to NIC, application maps (by using mmap( ) system call) this memory in its virtual address space for writing transmit work request directly into the transmit queue memory. The hardware chip(s) of the NIC may perform various data processing techniques to transmit the application data, such as iSCSI and NVMe/TCP header and data digest computation and insertion in the PDU, packetization of the data, encapsulation and decapsulation, security processing, and so forth. By implementing the iSCSI, NVMe/TCP and TCP/IP stack in hardware of the NIC, the iSCSI and NVMe/TCP user space applications are able to transmit data from the user space application buffers directly to the NIC without the need to copy the data (e.g., copy in-and-out of kernel buffers), and the iSCSI and NVMe/TCP user space applications can directly write transmit work request into the transmit queues of the NIC.

User space applications issues a system call to create a receive queue, kernel allocates memory for receive queue and provides this address to NIC. Application maps (mmap( )) this memory in its virtual address space for reading PDU transmit and receive completion directly from the receive queue. The applications may continue to poll receive queue(s) of the NIC to determine if NIC has written PDU transmit or receive completion into the receive queue.

Further, the user space applications may have data received from the destination device directly placed into their buffers by Direct Data Placement (DDP) module in NIC.

The techniques described in this application improve the ability for host devices and NICs to transmit data across various types of networks. For instance, the traditional techniques used for processing and transmitting TCP/IP data would require that user space applications use multiple system calls to the kernels where the TCP/IP stack was located for TCP/IP processing. Additionally, traditional techniques for transmitting and receiving data for socket-based applications would also require the copy of data from application to kernel buffers and from kernel buffers to application buffers. These system calls, the TCP/IP processing performed in software/firmware, and the data copy between kernel and application buffers all increase CPU utilization and I/O latency for host devices and NICs that transmit and receive data. The techniques described herein reduce CPU utilization and I/O latency when communicating traffic using network connections, such as TCP/IP connections. For instance, the techniques provide a method of kernel bypass for iSCSI and NVMe/TCP data path communications by registering transmit and receive virtual memory buffers with the NIC, creating transmit and receive queue, mapping transmit and receive queue memory in application's virtual address space and directly writing transmit work request into the transmit queue memory, and/or polling receive queues for PDU transmit and receive completion, and by directly placing received data into the application buffers. Further, the iSCSI, NVMe/TCP and TCP/IP layers or protocol stacks that handle the data plane traffic for iSCSI and NVMe/TCP connections may be implemented in hardware of the NIC, which removes the need for the system calls made to the kernel for data plane communications.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram 100 of an example host device 102 that offloads iSCSI and NVMe/TCP processing for data plane traffic to be performed by hardware of a network interface card (NIC) 106.

Although illustrated as a server, the host device 102 may be any type of computing device that may couple to a NIC 106, such as personal user devices (e.g., desktop computers, laptop computers, phones, tablets, wearable devices, entertainment devices such as televisions, etc.), network devices (e.g., servers, routers, switches, access points, etc.), and/or any other type of computing device.

The NIC 106, also referred to as a network adapter or LAN adapter, may generally be a hardware component or device that enables a host device 102 or other computing device to connect to one or more networks 108. The NIC 106 generally serves as the interface between the host device 102 and the network(s) 108, facilitating the transmission and reception of data packets over the network(s). The NIC 106 may provide network connectivity to the host device 102, and allow the host device 102 to communicate with other devices over the network(s) 108, such as one or more remote devices 110. The NIC 106 may provide a physical and/or wireless connection to the infrastructure of the network(s) 108, such as using Ethernet, Wi-Fi, cellular, or other communication standards. The NIC 106 may come in various form factors, such as expansion cards that are installed inside the host device 102, integrated circuits build into the host device 102 (e.g., integrated NICs), USB devices, and/or wireless adapters. The NIC 106 may transmit and receive packets communicated between the host device 102 and the remote device(s) 110 over the network(s) 108.

The NIC may be communicatively connected to the host device 102 via one or more communication interfaces 104. The communication interface 104 may be any type of interface configured to communicatively couple a NIC 106 to a host device 102, either wired or wirelessly, such as a PCIe (Peripheral Component Interconnect Express) interface, a USB (Universal Serial Bus) interface, Ethernet Port, Thunderbolt interface, and so forth.

The host device 102 may include a user space 112 in which one or more iSCSI and/or NVMe/TCP protocol applications 114 run. The user space 112 may be a portion of memory in the host device 102 and associated processing resources where user-space applications run. Generally, the user space 112 provides the application(s) 114 with less privileges than processes that run in the kernel space 116 of the memory of the host device 102. The application(s) 114 may include iSCSI and NVMe/TCP applications that may run on a host device 102. The kernel space 116 is a more privileged portion of the memory of the host device 102 and is associated processing resource that are reserved for critical functions of the operating system and device drivers.

Generally, the application(s) 114 running in the user space 112 send and receive communications with the remote device(s) 110 using the NIC 106. In some examples, the control path 122 for these communications may be performed through the kernel space using system calls. That is, portions of the network protocol stack used for control path 122 communications may be stored and/or executed in the kernel space 116. The application(s) 114 use system calls with the kernel space 116 in order to perform various functions in the control path 122 for TCP/IP connections. Control path 122 functions or operations may include socket creation (e.g., socket( ) system call), address binding (e.g., bind( ) system call), connection establishment (e.g., connect( ) system call), connection termination (e.g., close( ) system call), and other control path 122 operations. The kernel space 116 may interact with the NIC 106 via the communication interface 104 to perform these control path 122 communications.

As shown, the NIC 106 includes various network adapter components 118 that may be hardware, software, and/or firmware. In the illustrated example, the NIC 106 may include some or all of the iSCSI, NVMe/TCP and TCP/IP protocol stack that is implemented in hardware and used to perform various data plane processing for iSCSI and NVMe/TCP connections. In some instances, the iSCSI, NVMe/TCP and TCP/IP protocol stack may be implemented in hardware (e.g., silicon, silicon hybrids, and/or other conducting materials) during manufacturing where the electronic components are designed and fabricated on wafers to perform various iSCSI, NVMe/TCP and TCP/IP data processing techniques. The NIC 106 may include a transmit queue in which PDU transmit work request is written by the application(s) 114 via the data path 124 that is to be transmitted to a remote device 110 via the TCP/IP connection. The iSCSI, NVMe/TCP and TCP/IP protocol stack 120 that is fabricated in hardware chip(s) of the NIC 106 may perform various data processing techniques to transmit the application data, such as header and data digest computation and insertion, packetization of the data, encapsulation and decapsulation, security processing, and so forth. By implementing the iSCSI, NVMe/TCP and TCP/IP protocol stack 120 in hardware of the NIC 106, the iSCSI and NVMe/TCP user space applications 114 are able to transmit data from the user space application buffers directly to the NIC 106 via the data path 124 without the need to copy the data (e.g., copy in-and-out of kernel buffers), and the user space applications 114 can directly write the PDU transmit work request into the transmit queues of the NIC 106.

Further, the iSCSI and NVMe/TCP user space applications 114 may have data received from the remote device 110 via the TCP/IP connection placed directly into their application buffers from the NIC 106. For instance, the applications may continue to poll receive queue(s) of the NIC 106 to determine if data has been received from the remote device 110, and the data may be directly placed by the DDP module in NIC into the user space application buffers.

As shown, control plane traffic 126 and data plane traffic 128 associated with the iSCSI or NVMe/TCP connections may be transmitted over the one or more networks 108. The network(s) 108 may comprise any type of network or combination of networks, including wired and/or wireless networks. For instance, the network(s) 108 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

In some instances, the host device 102 may be devices located in one or more data centers that may be located at different physical locations. For instance, the host device 102 and NIC 106 may be supported by networks of devices in a public cloud computing platform, a private/enterprise computing platform, and/or any combination thereof. The one or more data centers may be physical facilities or buildings located across geographic areas that designated to store networked devices used as host devices 102. The data centers may include various networking devices, as well as redundant or backup components and infrastructure for power supply, data communications connections, environmental controls, and various security devices. In some examples, the data centers may include one or more virtual data centers which are a pool or collection of cloud infrastructure resources specifically designed for enterprise needs, and/or for cloud-based service provider needs. Generally, the data centers (physical and/or virtual) may provide basic resources such as processor (CPU), memory (RAM), storage (disk), and networking (bandwidth). However, in some examples the devices in the distributed application architecture may not be located in explicitly defined data centers, but may be located in other locations or buildings.

Figure 2:
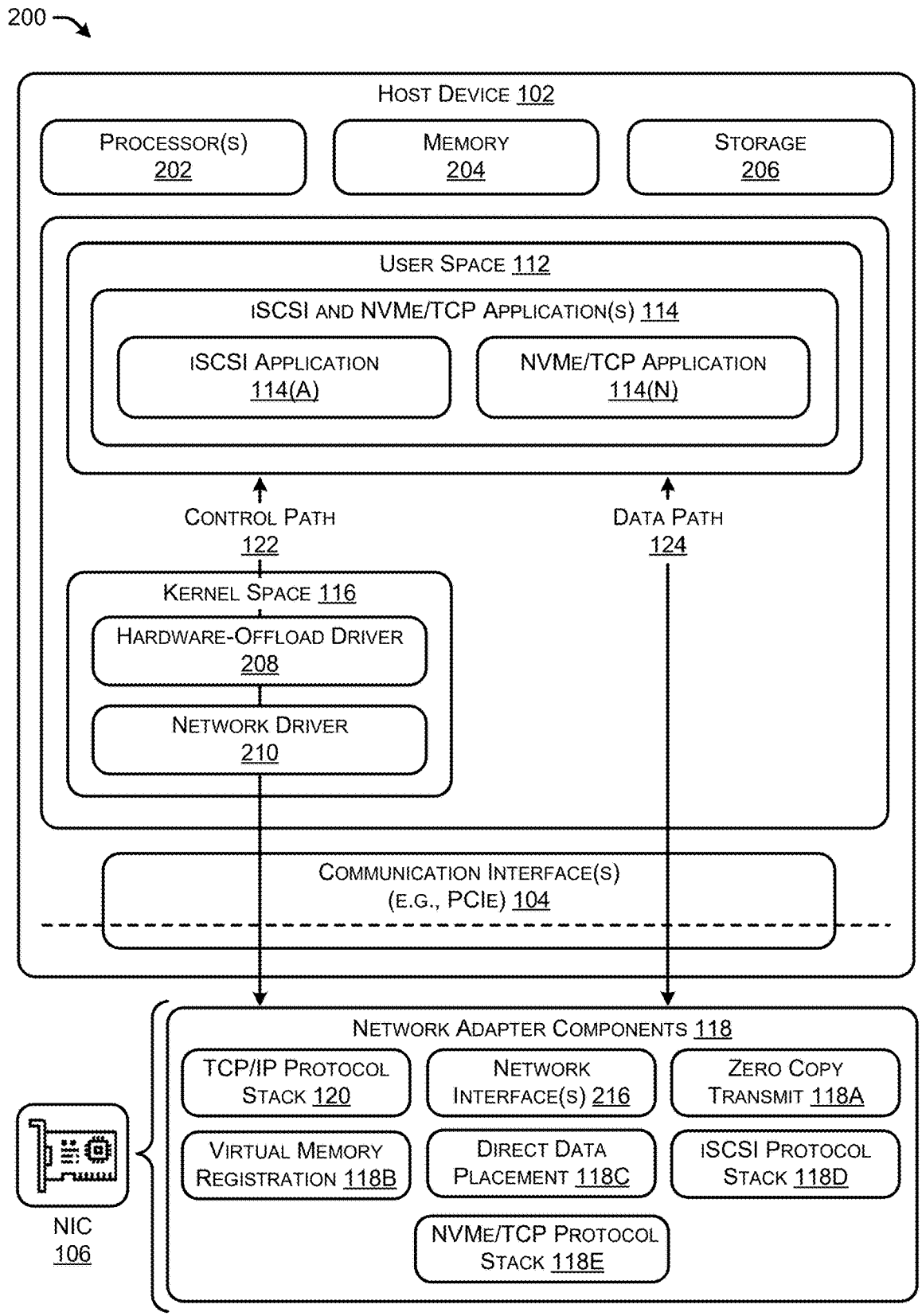
FIG. 2 illustrates a component diagram of host device and a NIC where the components of the host device offload iSCSI and NVMe/TCP processing for data plane traffic to hardware of the NIC.

FIG. 2 illustrates a component diagram 200 of host device 102 and NIC 106 where the components of the host device 102 offload iSCSI and NVMe/TCP processing for data plane traffic to hardware of the NIC 106. Insofar as the components in FIG. 1 are the same as those shown in FIG. 2 the components may perform the same or similar functionality as that described with respect to FIG. 1.

As illustrated, the host device 102 may include one or more hardware processors 202 (processors) configured to execute one or more stored instructions. The processor(s) 202 may comprise one or more cores, and the cores may be of different types. For example, the processor(s) 202 may include application processor units, graphic processing units (GPUs), and so forth. In one implementation, the processor(s) 202 may comprise a microcontroller and/or a microprocessor. The processor(s) 202 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 202 may possess its own local memory, which also may store program components, program data, and/or one or more operating systems.

The host device 102 may further include memory 204, such as computer-readable media, that may include volatile and nonvolatile memory, removable and non-removable media implemented in any method or technology for storage of information, such as computer-readable instructions, data structures, program component, or other data. Such memory 204 may include, but is not limited to, RAM, dynamic RAM, static RAM, SDRAM, cache memory, read-only memory, or any other medium which can be used to store the desired information and which can be accessed by a computing device. The memory 204 may be implemented as computer-readable storage media ("CRSM"), which may be any available physical media accessible by processor(s) 202 to execute instructions stored on the memory 204. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s).

The host device 102 may further include storage 206 (e.g., long-term storage), which may be ROM, EEPROM, hard disk drives (HDDs), solid state drives (SSDs), flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by the host device 102.

As shown, the kernel space 116 may include a hardware-offload driver 208 and a network driver 210. The hardware-offload driver 208 in the kernel space 116 may offload certain tasks or processing from the processor(s) 202 to specialized hardware components on the NIC 106. The offload tasks may include iSCSI, NVMe/TCP and TCP/IP Offload where hardware-offload driver 208 may cause the processing of iSCSI, NVMe/TCP stack tasks such as computation and insertion of header and data digest while transmitting iSCSI and NVMe/TCP PDUs and computation and validation of header and data digest on receiving iSCSI and NVMe/TCP PDUs, iSCSI and NVMe/TCP Segmentation Offload, while receiving TCP payload delineating iSCSI and NVMe/TCP PDU in TCP byte stream, Direct Data Placement (DDP) into the user space application buffers, TCP/IP protocol stack 120 tasks, such as TCP segmentation (TSO/LSO) and reassembly, checksum calculation, TCP congestion management and TCP connection management, directly on the hardware of the NIC 106. This reduces the CPU overhead associated with these tasks and improves network throughput.

The network driver 210 in the kernel space 116 may serve as the interface between the operating system's networking stack and the physical network hardware. The network driver 210 may help perform various control plane operations for iSCSI and NVMe/TCP connections, and other connection, such as hardware abstraction, device initialization, control plane transmission and reception, interrupt handling, buffer management, error handling, and performance optimization.

As further shown, the NIC includes virtual memory registration module 118B, this module registers transmit and receive virtual memory buffers with the NIC.

NIC also includes zero copy transmit module 118A to transmit data directly from iSCSI and NVMe/TCP user space application buffers.

NIC also includes Direct Data Placement (DDP) module 118C to place data directly into the iSCSI and NVMe/TCP user space application buffers.

NIC 106 also includes an iSCSI protocol stack 118D, and an NVMe/TCP protocol stack 118E.

In various examples, the iSCSI and NVMe/TCP user space applications 114 utilize one or more system libraries that act as a bridge library to get data sent directly to the hardware of the NIC 106. The system libraries may provide Application Programming Interfaces (APIs) that enable the applications 114 to send and receive data via the data path 124 and directly with the NIC 106 (e.g., kernel bypass). Generally, the system libraries provide the applications 114 with an interface through which the applications 114 interact with the TCP/IP protocol stack 120. The applications 114 can make use of the APIs provided by the system libraries to initiate network operations via the data path 124, and the iSCSI, NVMe/TCP and TCP/IP protocol stack 120 that is implemented in hardware handles the processing of these operations.

The processor(s) 202 may further execute an operating system (OS) of the host device 102 where the OS manages the hardware and software resources of the host device 102. The OS may comprise any type of OS and perform tasks such as memory management, processor management, input/output device management, file management, security management, and user interfacing. The OS may help run various device processes of the host device 102, and the kernel space 116 may be included in the OS.

Figure 3:
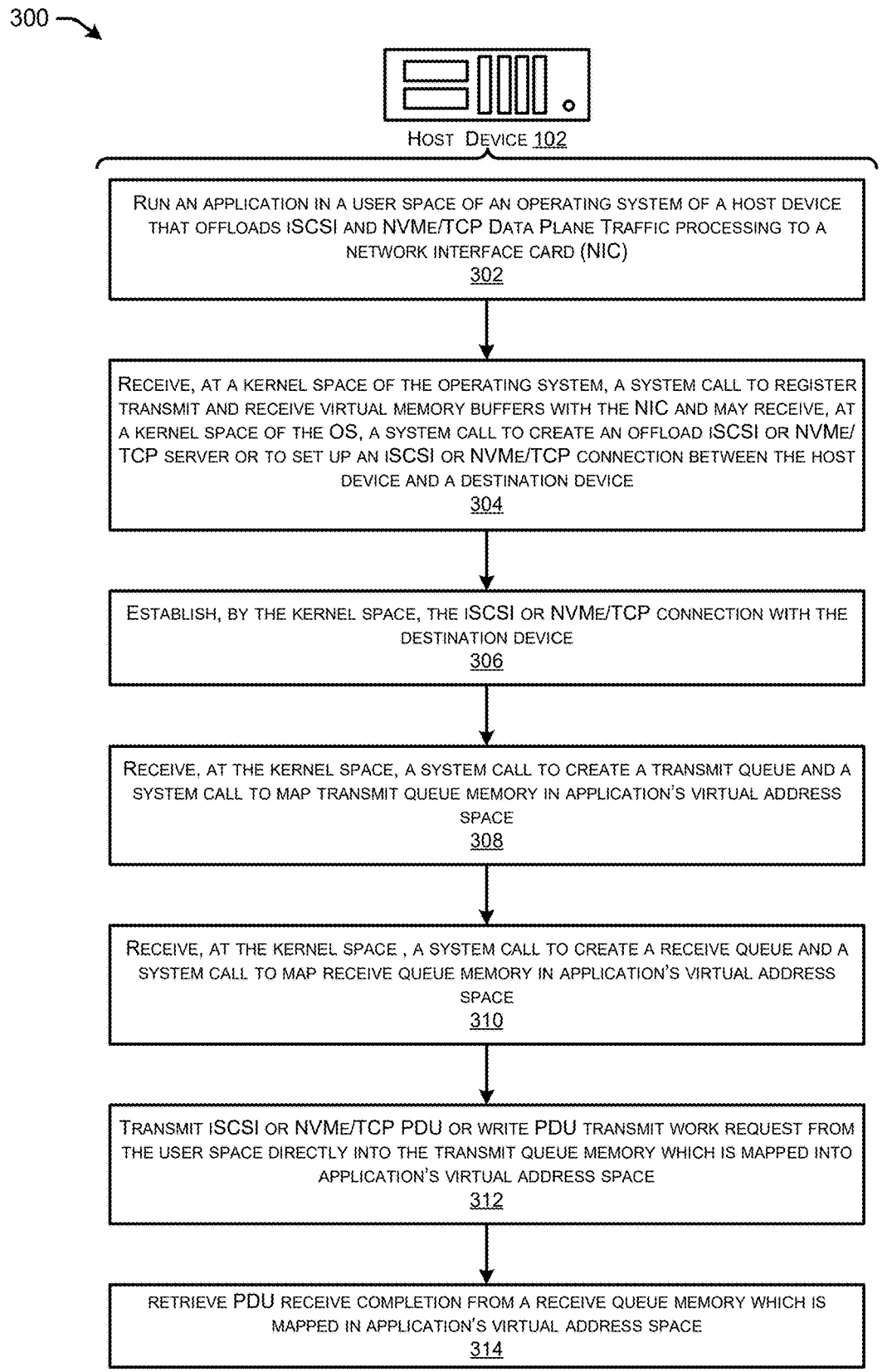
FIG. 3 illustrates a flow diagram of an example method for a host device to offload iSCSI and NVMe/TCP data plane processing to a NIC connected to the host device.
Figure 4:
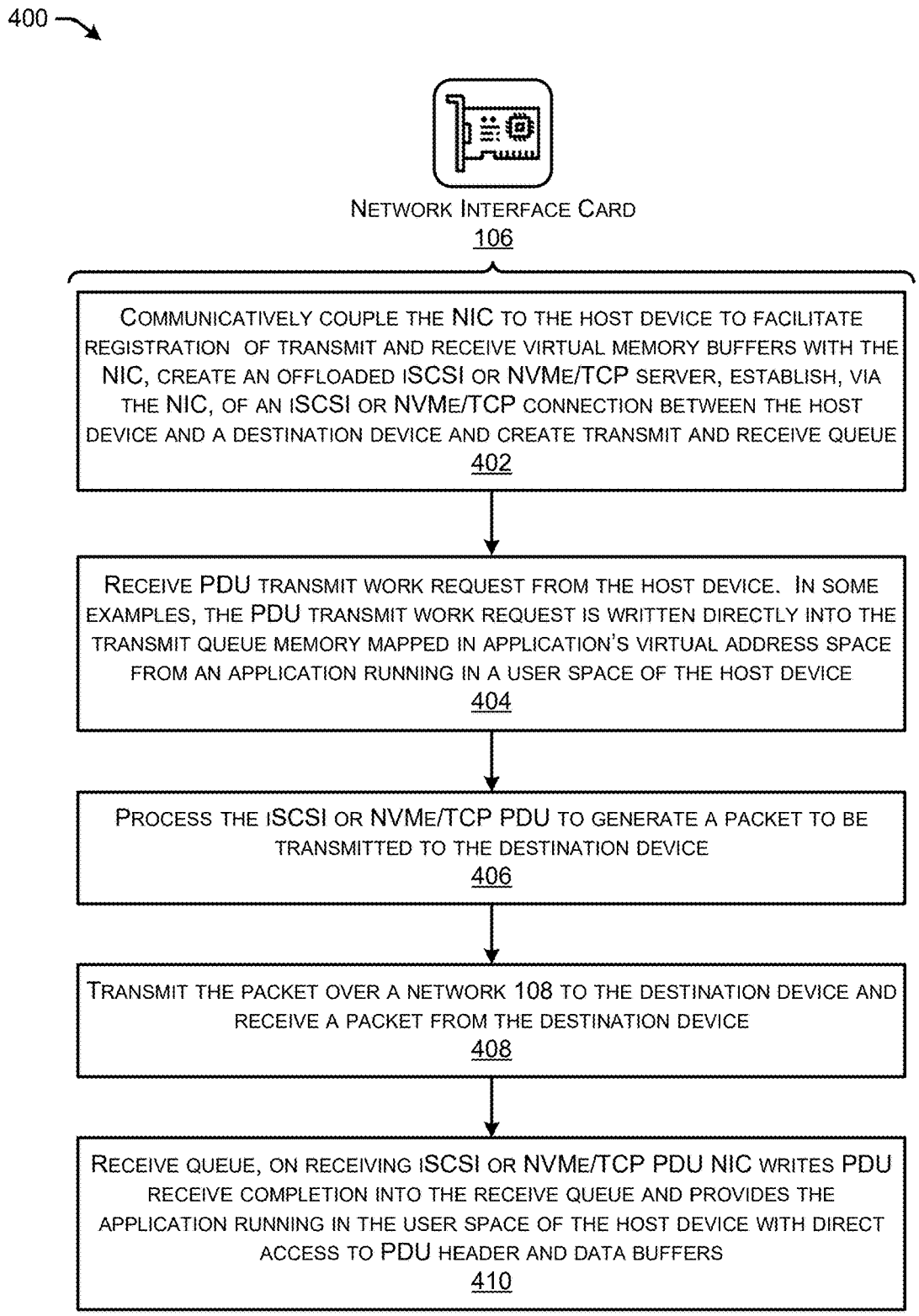
FIG. 4 illustrates a flow diagram of an example method for a NIC to perform iSCSI and NVMe/TCP data plane processing in hardware on behalf of a host device to which the NIC is connected.

FIGS. 3 and 4 illustrate flow diagrams of example methods 300 and 400 that illustrate aspects of the functions performed at least partly by the devices in the distributed application architecture as described in FIGS. 1 and 2. The logical operations described herein with respect to FIGS. 3 and 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 3 and 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, or different arrangements of components.

FIG. 3 illustrates a flow diagram of an example method 300 for a host device 102 to offload data plane processing for iSCSI and NVMe/TCP user space applications to a NIC 106 connected to the host device 102. The host device 102 may include one or more processors 202, a communications interface 104, and one or more non-transitory computing readable-media (e.g., memory 204) that comprises a user space 112 and a kernel space 116.

At 302, the host device 102 may run an iSCSI or NVMe/TCP application 114 in a user space 112 of the host device 102.

At 304, the host device 102 may receive, at a kernel space 116 of the operating system, a system call to register transmit and receive virtual memory buffers with the NIC. Further, at 304, the host device 102 may receive, at a kernel space 116 of the operating system, a system call to create an offloaded iSCSI or NVMe/TCP server or to set up an iSCSI or NVMe/TCP connection between the host device 102 and destination device with which the application desires to communicate.

At 306, the host device 102 may establish, by the kernel space 116, the iSCSI or NVMe/TCP connection with the destination device. In some examples, the kernel space 116 is configured to facilitate control plane operations associated with the iSCSI or NVMe/TCP connection, and the application 114 is configured to send data plane traffic directly to the NIC 106 via the data path 124 that bypasses the kernel space 116.

At 308, the host device 102 may receive, at a kernel space 116 of the operating system, a system call to create a transmit queue and a system call to map transmit queue memory in application's virtual address space.

At 310, the host device 102 may receive, at a kernel space 116 of the operating system, a system call to create a receive queue and a system call to map receive queue memory in application's virtual address space.

At 312, the application 114 may transmit iSCSI or NVMe/TCP PDU may write PDU transmit work request from the user space 112 directly into the transmit queue memory which is mapped in application's virtual address space. In some instances, the PDU is transmitted over a hardware interface 104 and via a data path 124 that bypasses the kernel space 116.

In some examples, the method 300 may further comprise storing a library of Application Programming Interface (API) usable by applications 114 executing in the user space 112 to interact directly with the NIC. In such examples, transmitting a PDU includes utilizing, by the application 114, a SEND API from the library that writes the PDU transmit work request from the user space 112 directly into the transmit queue memory mapped in application's virtual address space.

At 314, the application 114 may retrieve PDU receive completion from a receive queue memory which is mapped in application's virtual address space. The PDU receive completion is retrieved over the hardware interface 104 and via the data path 124 that bypasses the kernel space 116.

In various examples, the method 300 further includes polling, by the application 114, the receive queue to determine whether NIC has written a PDU receive completion, and determining the buffer address of PDU header and Immediate Data (if PDU has Immediate Data) based at least in part on the PDU receive completion read by polling.

In some instances, the method 300 further includes retrieving, by the application 114, a transmit completion packet directly from the receive queue memory which is mapped in application's virtual address space. In such examples, the transmit completion packet is retrieved over the hardware interface 104 and via the data path 124 that bypasses the kernel space 116. On receiving transmit completion application can free or reuse transmit buffers.

In some instances, the method 300 further includes receiving, by the application 114 and via the kernel space 116, a notification indicating that the receive queue has received the PDU transmit or receive completion. In such examples, the PDU transmit or receive completion is retrieved by the application via the data path 124 and responsive to receiving notification.

FIG. 4 illustrates a flow diagram of an example method 400 for a NIC 106 to perform data plane processing in hardware on behalf of a host device 102 to which the NIC 106 is connected.

The NIC may include virtual memory registration module to register transmit and receive virtual memory buffers with the NIC.

The NIC 106 may include a communications interface configured to communicatively couple the NIC 106 to the host device 102 and at 402, to facilitate registration of transmit and receive virtual memory buffers with the NIC, creating an offloaded iSCSI or NVMe/TCP server, establishment, via the NIC 106, of an iSCSI or NVMe/TCP connection between the host device 102 and a destination device and creating transmit and receive queue.

The NIC 106 may include a transmit queue configured to receive, at 404 and via the communications interface, PDU transmit work request from the host device. In some examples, the PDU transmit work request is written directly into the transmit queue memory mapped in application's virtual address space 212 from an application 114 running in a user space 112 of the host device 102.

The NIC may include zero copy transmit module to transmit data directly from user space application's buffers.

The NIC 106 may include one or more hardware chips encoded with iSCSI, NVMe/TCP and Transport Control Protocol/Internet Protocol (TCP/IP) protocol stack 120 configured to, at 406, process the iSCSI or NVMe/TCP PDU to generate a packet to be transmitted to the destination device.

The NIC 106 may include a network interface 216 configured to, at 408, transmit the packet over a network 108 to the destination device and receive a packet from the destination device (e.g., remote device 110).

The NIC 106 may further include a receive queue, on receiving iSCSI or NVMe/TCP PDU NIC writes PDU receive completion into the receive queue and provides the application 114 running in the user space 112 of the host device 102 with direct access to PDU header and data buffers. NIC also writes transmit completion into the receive queue, on receiving transmit completion application can free or reuse transmit buffers.

NIC also includes Direct Data Placement (DDP) module to place data directly into the user space application buffers.

In some examples, the method 300 may include providing, to a kernel space 116 of the host device 102, a notification indicating that the receive queue has received the PDU transmit completion or PDU receive completion.

In some instances, the NIC 106 establishes or tear downs the iSCSI or NVMe/TCP connection at least partly by receiving control plane commands from a kernel space 116 of an operating system of the host device 102.

Figure 5:
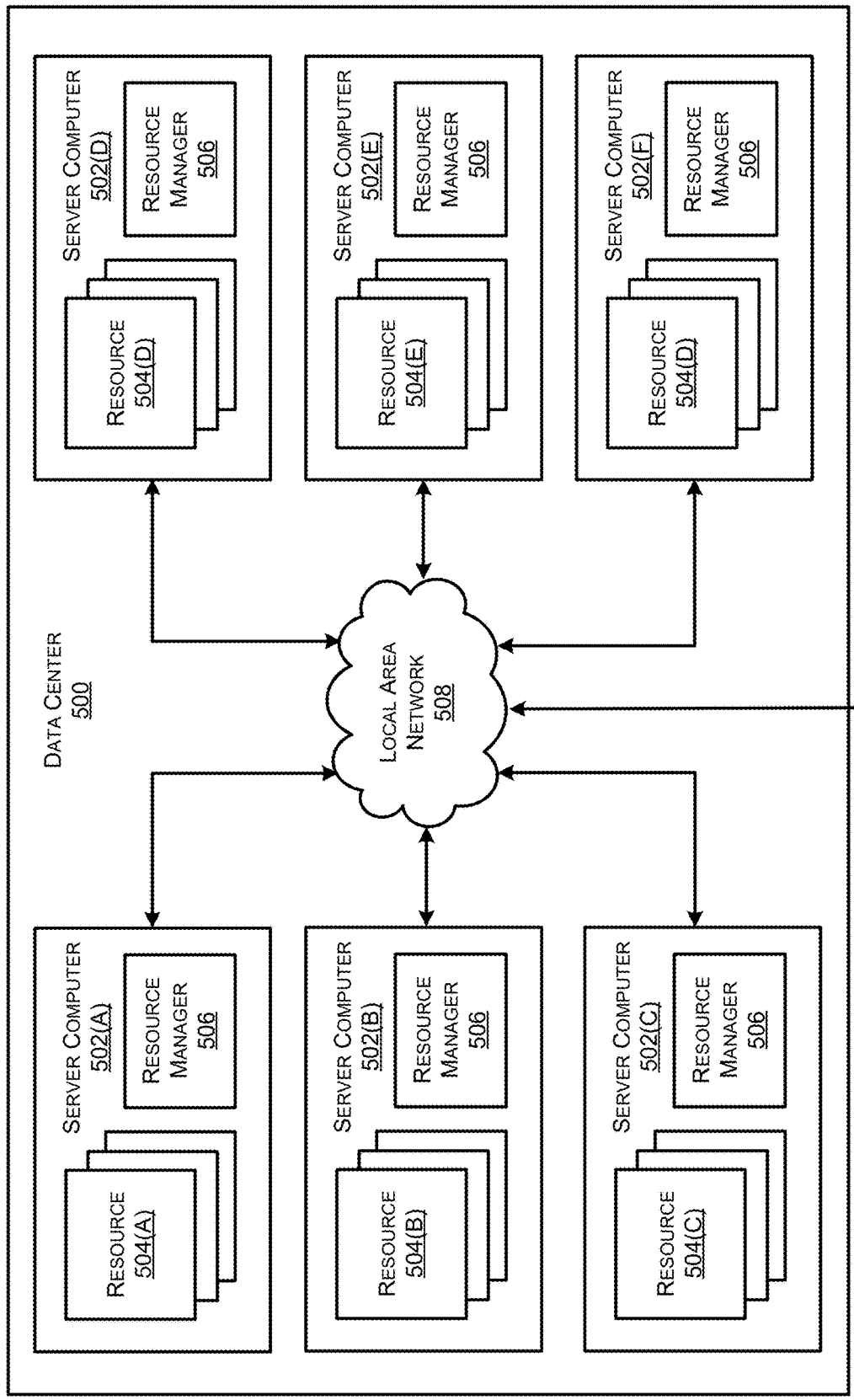
FIG. 5 illustrates a computing system diagram illustrating a configuration for a data center that can be utilized to implement aspects of the technologies disclosed herein.

FIG. 5 is a computing system diagram illustrating a configuration for a data center 500 that can be utilized to implement aspects of the technologies disclosed herein. The example data center 500 shown in FIG. 5 includes several computers 502A-502F (which might be referred to herein singularly as "a computer 502" or in the plural as "the computers 502") for providing computing resources. In some examples, the resources and/or computers 502 may include, or correspond to, the any type of networked device described herein. Although described as servers, the computers 502 may comprise any type of networked device, such as servers, switches, routers, hubs, bridges, gateways, modems, repeaters, access points, etc.

In some instances, the data center 500 may be an example of a computing environment that includes host devices 102 and NICs 106 as described herein. further, the computer 502 may be examples of the host devices 102 that are connected to NICs 106.

The computers 502 can be standard tower, rack-mount, or blade server computers configured appropriately for providing computing resources. In some examples, the computers 502 may provide computing resources 504 including data processing resources such as VM instances or hardware computing systems, database clusters, computing clusters, storage clusters, data storage resources, database resources, networking resources, and others. Some of the computers 502 can also be configured to execute a resource manager 506 capable of instantiating and/or managing the computing resources. In the case of VM instances, for example, the resource manager 506 can be a hypervisor or another type of program configured to enable the execution of multiple VM instances on a single computer 502. The computers 502 in the data center 500 can also be configured to provide network services and other types of services.

In the example data center 500 shown in FIG. 5, an appropriate LAN 508 is also utilized to interconnect the computers 502A-502F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 500, between each of the computers 502A-502F in each data center 500, and, potentially, between computing resources in each of the computers 502. It should be appreciated that the configuration of the data center 500 described with reference to FIG. 5 is merely illustrative and that other implementations can be utilized.

In some examples, the computers 502 may each execute one or more application containers and/or virtual machines to perform techniques described herein.

In some instances, the data center 500 may provide computing resources, like application containers, VM instances, and storage, on a permanent or an as-needed basis. Among other types of functionality, the computing resources provided by a cloud computing network may be utilized to implement the various services and techniques described above. The computing resources 504 provided by the cloud computing network can include various types of computing resources, such as data processing resources like application containers and VM instances, data storage resources, networking resources, data communication resources, network services, and the like.

Each type of computing resource 504 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 504 not mentioned specifically herein.

The computing resources 504 provided by a cloud computing network may be enabled in one embodiment by one or more data centers 500 (which might be referred to herein singularly as "a data center 500" or in the plural as "the data centers 500"). The data centers 500 are facilities utilized to house and operate computer systems and associated components. The data centers 500 typically include redundant and backup power, communications, cooling, and security systems. The data centers 500 can also be located in geographically disparate locations. One illustrative embodiment for a data center 500 that can be utilized to implement the technologies disclosed herein will be described below with regard to FIG. 6.

Figure 6:
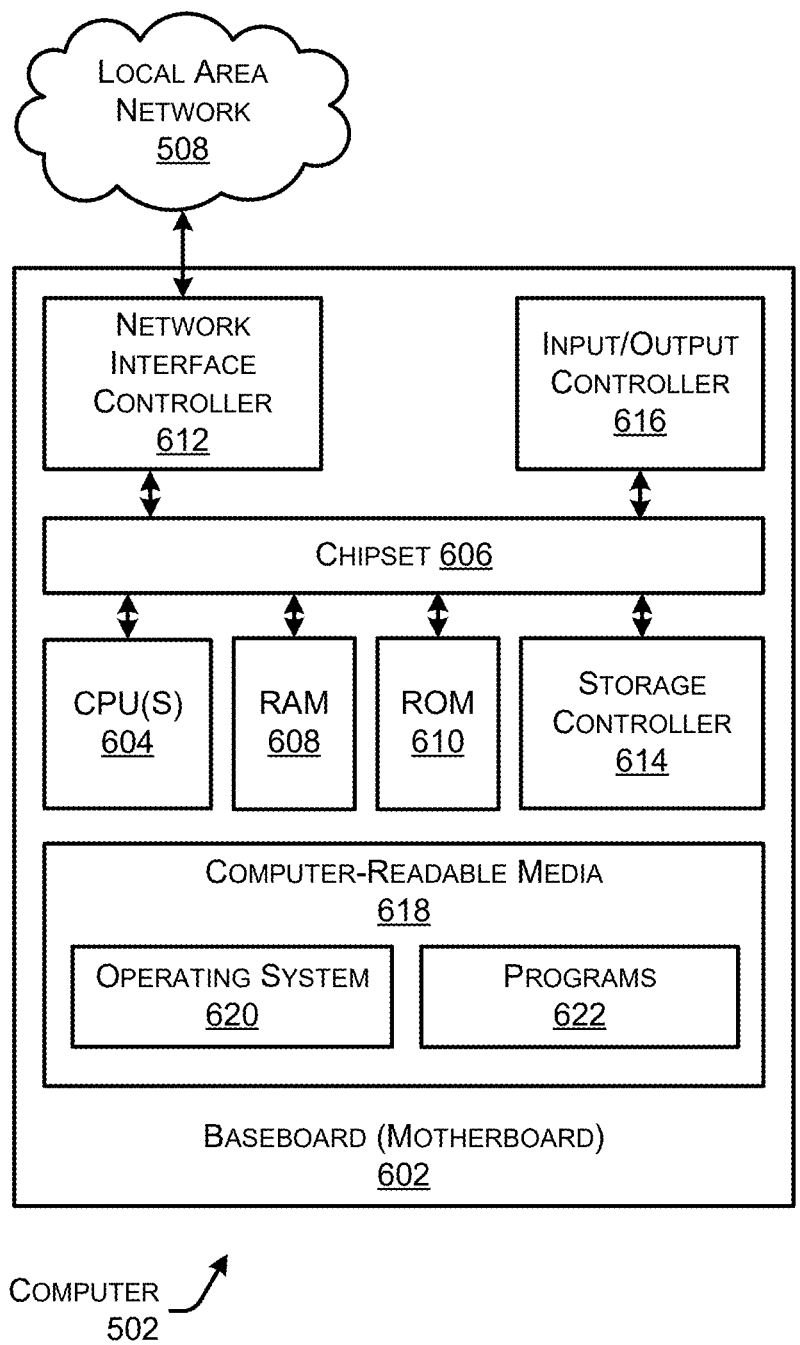
FIG. 6 is a computer architecture diagram showing an illustrative computer hardware architecture for implementing a computing device that can be utilized to implement aspects of the various technologies presented herein.

FIG. 6 shows an example computer architecture for a computer 502 capable of executing program components for implementing the functionality described above. The computer architecture shown in FIG. 6 illustrates a conventional server computer, workstation, desktop computer, laptop, tablet, network appliance, e-reader, smartphone, or other computing device, and can be utilized to execute any of the software components presented herein. The computer 502 may, in some examples, correspond to a host device 102 described herein, and may comprise networked devices such as servers, switches, routers, hubs, bridges, gateways, modems, repeaters, access points, etc.

The computer 502 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 502.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 502. The chipset 606 can further provide an interface to a computer-readable storage medium such as a read-only memory ("ROM") 610 or non-volatile RAM ("NVRAM") for storing basic routines that help to startup the computer 502 and to transfer information between the various components and devices. The ROM 610 or NVRAM can also store other software components necessary for the operation of the computer 502 in accordance with the configurations described herein.

The computer 502 can operate in a networked environment using logical connections to remote computing devices and computer systems through a network, such as the network 508. The chipset 606 can include functionality for providing network connectivity through a NIC 612, such as a gigabit Ethernet adapter. The NIC 612 is capable of connecting the computer 502 to other computing devices over the network 508 (and/or 108). It should be appreciated that multiple NICs 612 can be present in the computer 502, connecting the computer to other types of networks and remote computer systems.

The computer 502 can be connected to a storage device 618 that provides non-volatile storage for the computer. The storage device 618 can store an operating system 620, programs 622, and data, which have been described in greater detail herein. The storage device 618 can be connected to the computer 502 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 502 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computer 502 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 502 can further read information from the storage device 618 by detecting the physical states or characteristics of one or more particular locations within the physical storage units.

In addition to the mass storage device 618 described above, the computer 502 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 502.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 502. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 502.

In one embodiment, the storage device 618 or other computer-readable storage media is encoded with computer-executable instructions which, when loaded into the computer 502, transform the computer from a general-purpose computing system into a special-purpose computer capable of implementing the embodiments described herein. These computer-executable instructions transform the computer 502 by specifying how the CPUs 604 transition between states, as described above. According to one embodiment, the computer 502 has access to computer-readable storage media storing computer-executable instructions which, when executed by the computer 502, perform the various processes described above with regard to FIGS. 1-5. The computer 502 can also include computer-readable storage media having instructions stored thereupon for performing any of the other computer-implemented operations described herein.

The computer 502 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 502 might not include all of the components shown in FIG. 6, can include other components that are not explicitly shown in FIG. 6, or might utilize an architecture completely different than that shown in FIG. 6.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A host device configured to offload iSCSI and NVMe/TCP data plane traffic processing to a network interface card (NIC) connected to the host device, the host device comprising:

one or more processors;
a communications interface configured to communicatively couple the host device to the NIC;
one or more non-transitory computer-readable media storing computer-executable instructions that, when executed by the one or more processors, cause the one or more processors to perform operations comprising:
running an iSCSI or NVMe/TCP application in a user space of the host device;
receiving, at kernel space of an operating a system call to register transmit and receive virtual memory buffers with the NIC; receiving, at a kernel space of an operating system, a system call to create an offloaded iSCSI or NVMe/TCP server or to set up a iSCSI or NVMe/TCP connection between the host device and destination device with which the application desires to communicate;
establishing, by the kernel space, the iSCSI or NVMe/TCP connection with the destination device;
receiving, at kernel space of an operating system a system call to create transmit queue and a system call to map transmit queue memory in application's virtual address space;
receiving, at kernel space of an operating system a system call to create receive queue and a system call to map receive queue memory in application's virtual address space;
writing, by the application, iSCSI or NVMe/TCP PDU transmit work request from the user space directly into the transmit queue memory mapped in application's virtual address space, wherein the iSCSI or NVMe/TCP PDU is transmitted over a hardware interface and via a data path that bypasses the kernel space; and
retrieving, by the application, iSCSI or NVMe/TCP PDU receive completion from the receive queue memory mapped in application's virtual address space, the PDU receive completion being retrieved over the hardware interface and via the data path that bypasses the kernel space.

2. The host device of claim 1, the operations further comprising:
polling, by the application, the receive queue to determine whether PDU receive completion has been written by the NIC; and
determining the buffer address of iSCSI or NVMe/TCP PDU header and data based on data stored in the PDU receive completion.

3. The host device of claim 1, wherein:
the kernel is configured to facilitate control plane operations associated with the iSCSI and NVMe/TCP connection; and
the user space iSCSI or NVMe/TCP application is configured to send data plane traffic directly to the NIC via the data path that bypasses the kernel.

4. The host device of claim 1, the operations further comprising:
retrieving, by the application, a transmit completion directly from the receive queue memory mapped in application's virtual address space, the transmit completion being retrieved over the hardware interface and via the data path that bypasses the kernel space On receiving transmit completion application can free or reuse transmit buffers.

5. The host device of claim 1, the operations further comprising: receiving, by the application and via kernel space a notification indicating that the receive queue has received PDU transmit or receive completion, wherein retrieving is performed via the data path and responsive to receiving the notification.

6. The host device of claim 1, the operations further comprising:
storing a library of Application Programming Interface (API) usable by applications executing in the user space to interact directly with the NIC,
wherein transmitting the iSCSI or NVMe/TCP PDU includes utilizing, by the application, a SEND API from the library that writes PDU transmit work request directly into the transmit queue memory mapped in application's virtual address space.

7. The host device of claim 1, wherein the application comprises at least one of:
an Internet Small Computer System Interface (iSCSI) user space application; or
a Non-Volatile Memory Express over TCP (NVMe/TCP) user space application.

8. The host device of claim 1, wherein a iSCSI and NVMe/TCP protocol stack is encoded in hardware in one or more hardware chips of the NIC.

9. The host device of claim 1, wherein NIC comprises of a virtual memory registration module to register iSCSI and NVMe/TCP transmit and receive virtual memory buffers with the NIC.

10. The host device of claim 1, wherein NIC comprises of zero copy transmit module to transmit iSCSI and NVMe/TCP data directly from user space application buffers.

11. The host device of claim 1, wherein NIC comprises of Direct Data Placement (DDP) module to place iSCSI and NVMe/TCP data directly into the user space application buffers.

12. A method performed by a host device to offload iSCSI and NVMe/TCP data plane traffic processing to a network interface card (NIC) connected to the host device, the method comprising:
running an iSCSI or NVMe/TCP application in a user space of the host device;
receiving, at a kernel space of an operating system a system call to register transmit and receive virtual memory buffers with the NIC;
receiving, at a kernel space of an operating system, a system call to set up an offloaded iSCSI or NVMe/TCP server or to set up an iSCSI or NVMe/TCP connection between the host device and destination device with which the application desires to communicate;
receiving, at a kernel space of an operating system, a system call to create a transmit queue and a system call to map transmit queue memory in application's virtual address space;
receiving, at a kernel space of an operating, a system call to create a receive queue and to map receive queue memory in application's virtual address space;
establishing, by the kernel space, the iSCSI or NVMe/TCP connection with the destination device;
writing, by the application, iSCSI or NVMe/TCP PDU transmit work request from the user space directly into a transmit queue memory mapped in application's virtual address space, wherein the PDU is transmitted over a hardware interface and via a data path that bypasses the kernel space; and
retrieving, by the application, iSCSI or NVMe/TCP PDU receive completion from a receive queue memory mapped in application's virtual address space, the PDU being retrieved over the hardware interface and via the data path that bypasses the kernel space.

13. The method of claim 12, further comprising:
polling, by the application, the receive queue to determine whether PDU receive completion has been posted by the NIC; and
determining the buffer address of iSCSI or NVMe/TCP PDU header and data based on data stored in the PDU receive completion.

14. The method of claim 12, wherein:
the kernel is configured to facilitate control plane operations associated with the iSCSI and NVMe/TCP connection; and
the application is configured to send data plane traffic directly to the NIC via the data path that bypasses the kernel.

15. The method of claim 12, further comprising:
retrieving, by the application, a transmit completion directly from the receive queue memory mapped in application's virtual address space, the transmit completion being retrieved over the hardware interface and via the data path that bypasses the kernel space On receiving transmit completion application can free or reuse transmit buffers.

16. The method of claim 12 further comprising: receiving, by the application and via the kernel space, a notification indicating receive queue has received PDU transmit or receive completion, wherein the retrieving is performed via the data path and responsive to receiving the notification.

17. The method of claim 12, further comprising:
storing a library of Application Programming Interface (API) usable by applications executing in the user space to interact directly with the NIC,
wherein transmitting the iSCSI or NVMe/TCP includes utilizing, by the application, a SEND API from the library that that writes PDU transmit work request from the user space directly into the transmit queue memory mapped in application's virtual address space.

18. The method of claim 12, wherein the application comprises at least one of:
an Internet Small Computer System Interface (iSCSI) user space application; or
a Non-Volatile Memory Express over TCP (NVMe/TCP) user space application.

19. The method of claim 12, wherein iSCSI and NVMe/TCP protocol stack is encoded in hardware in one or more hardware chips of the NIC.

20. The method of claim 12, wherein a virtual memory registration module to register iSCSI and NVMe/TCP transmit and receive virtual memory buffers with the NIC is encoded in hardware in one or more hardware chips of the NIC.

21. The method of claim 12, wherein a zero copy transmit module to transmit iSCSI and NVMe/TCP data directly from user space application buffers is encoded in hardware in one or more hardware chips of the NIC.

22. The method of claim 12, wherein a Direct Data Placement (DDP) module to place iSCSI and NVMe/TCP data directly into the user space application buffers is encoded in hardware in one or more hardware chips of the NIC.

23. A network interface card (NIC) comprising:
one or more processors;
a communications interface configured to communicatively couple the NIC to a host device facilitate establishment, via the NIC, of an iSCSI or NVMe/TCP connection between the host device and a destination device;
a transmit queue configured to receive, via the communications interface, iSCSI or NVMe/TCP PDU transmit work request from the host device, the PDU transmit work request being written into the transmit queue memory mapped in application's virtual address space directly from an application running in a user space of the host device;
one or more hardware chips encoded with a iSCSI and NVMe/TCP stack configured to process the PDU to generate a packet to be transmitted to the destination device;
a network interface configured to transmit the packet over a network to the destination device and receive a packet from the destination device; and
a receive queue configured to receive PDU transmit and receive completion and provide the application running in the user space virtual address of PDU header and buffer.

24. The NIC of claim 23, further comprising logic that configures the NIC to:
provide, to a kernel space of the host device, a notification indicating that the receive queue has received the PDU transmit or receive completion.

25. The NIC of claim 23, wherein the NIC establishes the iSCSI or NVMe/TCP connection at least partly by receiving control plane commands from a kernel of an operating system of the host device.

26. The NIC of claim 23, wherein data plane traffic that is communicated via the iSCSI or NVMe/TCP connection is received directly from the iSCSI and NVMe/TCP application running in the user space of the host device.

* * * * *